UNITED STATES PATENT OFFICE.

GEORGE W. PRESSELL, OF PHILADELPHIA, PENNSYLVANIA, ASSIGNOR TO E. F. HOUGHTON & CO., OF PHILADELPHIA, PENNSYLVANIA, A CORPORATION OF PENNSYLVANIA.

CARBURIZING MATERIAL AND METHOD OF PRODUCING THE SAME.

1,292,044.     Specification of Letters Patent.     Patented Jan. 21, 1919.

No Drawing.     Application filed May 23, 1917. Serial No. 170,568.

*To all whom it may concern:*

Be it known that I, GEORGE W. PRESSELL, a citizen of the United States, residing in Philadelphia, Pennsylvania, have invented certain Improvements in Carburizing Material and Methods of Producing the Same, of which the following is a specification.

My invention relates to a new and useful carbonized vegetable product, particularly useful as an ingredient in carburizing material for the heat treatment of steel by dry packing.

One class of carburizing agent now well known comprises a carbonaceous material such as coke, charcoal, raw bone, or the like, mixed with a suitable energizer such as the various sodium or potassium salts. I have discovered that the shell of the ordinary cocoanut of commerce can be successfully carbonized to produce a form of charcoal, which so far as I am aware is a new product, and which can be satisfactorily employed as the carbonaceous ingredient of carburizing agents of the class mentioned.

Carbonization of the shell can be accomplished in an ordinary manner of producing charcoal, to wit, by heating in retorts to temperatures known to those skilled in the production of wood charcoal, the usual provision being made for the recovery of the various by-products of the distillation process. The resulting carbonized product is an extremely brittle form of charcoal, having good absorptive quality and capable of being readily crushed with a relatively small proportion of dust.

The shell-charcoal can be employed as an ingredient of carburizing material in the same manner as other forms of charcoal. I have found by test that the qualities of the carbonized material above pointed out, render it highly valuable for carburizing purposes, and the fact that cocoanut shells are commonly regarded as a waste product permits the production of the carbonized material at relatively small expense.

The carbonized shell when hot is subject to spontaneous combustion, and before it can be removed from the retort must be permitted to cool or be moistened. To save time in producing a carburizing material employing the product described, I have found it desirable to prepare a saturated aqueous solution of the carbonate energizer, preferably sodium carbonate, and to pour it upon the red hot charcoal within the retort. I thus moisten and cool the charcoal to overcome the tendency to spontaneous combustion and at the same time produce an intimate association of charcoal and energizer as desirable in a carburizing agent.

I claim:

1. A carburizing material for metals comprising a carbonized substance known in its natural state as cocoanut shell.

2. Carburizing material comprising carbonized cocoanut shell and an energizer incorporated therewith during the carbonization of said cocoanut shell.

3. Carburizing material containing carbonized cocoanut shell and sodium carbonate intimately incorporated therewith.

4. The method of producing an energized carbonaceous material for dry packing which consists in carbonizing cocoanut-shells in a retort and subjecting the carbonized product, at or near the heat of distillation, to the action of sodium carbonate in aqueous solution.

GEORGE W. PRESSELL.

Copies of this patent may be obtained for five cents each, by addressing the "Commissioner of Patents, Washington, D. C."